US006675231B1

(12) United States Patent
Hostyn

(10) Patent No.: US 6,675,231 B1
(45) Date of Patent: Jan. 6, 2004

(54) SYSTEM OF PROGRAM OBJECTS AND PROGRAM COMPONENTS WITH EXTERNAL INTERFACE

(75) Inventor: Tom Frans Maurits Hostyn, Halle (BE)

(73) Assignee: Sony Europa B.V., Badhoevedorp (NL)

( * ) Notice: Subject to any disclaimer, the term of this patent is extended or adjusted under 35 U.S.C. 154(b) by 25 days.

(21) Appl. No.: 09/178,877

(22) Filed: Oct. 26, 1998

(30) Foreign Application Priority Data

Oct. 27, 1997 (EP) .............................................. 97203323

(51) Int. Cl.[7] ................................................. G06F 9/00
(52) U.S. Cl. .......................................... 709/331; 386/46
(58) Field of Search ................................ 709/312–316, 709/331; 386/1, 46; 725/86–88

(56) References Cited

U.S. PATENT DOCUMENTS

| 5,126,843 A | | 6/1992 | Tanaka ........................ 358/138 |
| 5,745,764 A | * | 4/1998 | Leach et al. ................. 709/316 |
| 5,959,536 A | * | 9/1999 | Chambers .................... 340/636 |

FOREIGN PATENT DOCUMENTS

| EP | 0 610 701 A1 | 8/1994 |
| EP | 0 629 083 A | 12/1994 |

OTHER PUBLICATIONS

"Acrobat Viewer Plug–In API Overview, Technicat Note #5166", Jun. 5, 1997, Adobe Version 3.0.*
"Acrobat Viewer Plug–In API Overview, Technical Note #5166", Jun. 5, 1997, Adobe, Version 3.0.*
Erickson C et al: "SOMobjects Developer Toolkit: Sharing SOM Objects with DSOM" OS/2 Developer, vol. 6, No. 1, Jan. 1994, pp. 42–44, 46–50, 52/53, XP000672954.
Pountain D: "Parallel Course" BYTE, vol. 19, No. 7, Jul. 1, 1994, p. 53/54, 56, 58, 60 XP000445516.

* cited by examiner

*Primary Examiner*—John Follansbee
*Assistant Examiner*—Li Zhen
(74) *Attorney, Agent, or Firm*—Frommer Lawrence & Haug LLP; William S. Frommer; Samuel H. Megerditchian

(57) ABSTRACT

The present invention relates to a system of program objects and program components and communication between program objects and program components. The present invention provides a program component with an external or send interface which enables message passing communication between a program component and different program objects. When a program component is loaded, the send interface of the program component is automatically exported to the send interface of the host object. This means that the send interface of the object is modified to contain the send interface of the program component. Therefore it is possible to communicate by message passing between program components of a program object and other program objects.

14 Claims, 3 Drawing Sheets

SYSTEM OF PROGRAM OBJECTS AND PROGRAM COMPONENTS WITH EXTERNAL INTERFACE

Figure 1:
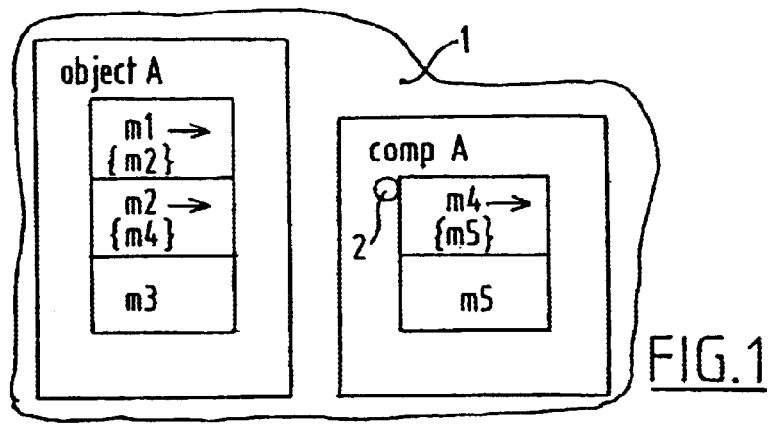

The present invention relates to a system of program objects and program components and communication between program objects and program components, and to an apparatus using this system.

Recently a new software technique has been developed, the so-called object oriented technique. The term object oriented means that software is organized as a set of discrete modules or program objects, that comprise both a data structure and behavior (operations), i.e. series of actions. This is contrary to the conventional programming technique, in which data structure and behavior are only loosely connected.

A program object is a run-time entity with his own thread of threads of execution with his own system resources. Program objects with the same data structure and behaviour (operations) are grouped into a class. Each object is an instance of a certain class. The operations determine the messages to which the object can respond, while the state is hidden from the outside like for example other objects. Variables that represent the internal state of an object are called instance variables and the operations thereof are called methods.

Each program object has an execution space that describes the properties of the object like which memory areas the object can access, which threads the object code execute and which is the run-time environment of the object. Communication between program objects occurs by message passing. In the non pre-published Japanese application No. 09-092446 of applicant a form of message passing is described. To execute message passing each object has an external interface, also called send interface, which arranges the receiving of the messages and with which the different methods of the corresponding program object are operable.

In the execution space of a program object a shared library in the form of one or more program components can be loaded. The program component is in this respect the shared library implementation for an object. A program component is loaded in an object if the program component is situated in the execution space of this object. A program component may provide an internal interface which is an ordered list of functions or methods that are implemented by the program component and that can be called by any function or method of the object.

In the Article by Erickson C. et al: "SOMOBJECTS DEVELOPER TOOLKIT: SHARING SOM OBJECTS WITH DSOM" OS/2 DEVELOPER, Vol. 6, No. 1, January 1994, it is disclosed to load a Dynamic Link Library (DLL) dynamically which is a standard implementation of a shared library. The DLL is provided with an external or send interface which enables message passing communication between the DLL and different program objects.

The DLL is however merely used to implement a given and fixed external interface, i.e. the external interface of the program object remains unchanged by loading the DLL.

According to an aspect of the present invention a system is provided, which comprises:

a program object with one or more functions;

an external interface with a description of the functions for communication with other program objects;

wherein upon loading of a program component a description of one or more functions of the program component is exported to the external interface of the program object. When a program component is loaded, the send interface of the program component is automatically exported to the send interface of the host object. This means that the send interface of the object is modified to contain the send interface of the program component. Therefore it is possible to communicate by message passing between program components of a program object and other program objects. There is no relationship between the content of the send interface and the content of the internal interface of an program component. A method of program component may appear in either, in both or in none.

According to a preferred embodiment a system is provided, wherein upon loading of an additional program component the description of one or more functions thereof is added to the external interface of the program object for communication with other program objects.

According to a preferred embodiment a system is provided, wherein upon removing a program component the description thereof in the external interface of the program object is removed from the external interface.

According to a further preferred embodiment of the present invention a system is provided, wherein upon replacing a first program component by a second program component, the description in the external interface of one or more functions of the first program component is replaced by a description of one or more functions of the second program component.

According to a further preferred embodiment a system is provided, wherein program components are loaded dynamically at run time.

The present invention provides for dynamic loading of program components with an external interface. Because loading a program component with a send interface will add this interface to the host object, and because program components can be dynamically added or replaced program components, the interface of the host objects can evolve over time. The interface of an object can shrink, such as when one program component is removed, or it can grow, as when a new program component is linked with (or an old program component is replaced by) an extended interface.

When a new implementation is required to for example implement a bug fix, implementation evolution can be utilised. This is administered by simply removing a dynamic linked program component and replacing it with a different program component that implements the same functionality in a different way.

A program component may or may not provide an internal or send interface. If it does not provide a send interface, it can only be invoked through a function call. In this case, it can also only be called from within the same execution space. Similarly, if a program component provides only a send interface, it is only accessible by other objects through message passing mechanisms.

Prior art high-level programs usually are translated into binary executable code by a compiler. In the last stage of compilation, a link editor links all the object executable files together with the start-up codes and library functions which are referenced in the program. In static linking, the link editor will incorporate a copy of the object files into the executable at link time. A static library is a collection of object files which contain library routines and data. In dynamic linking, the shared libraries are mapped at run time. The link editor will only store in the executable the name of the shared library and some additional information about the symbols referenced by the executable. With dynamic loading a routine is loaded only when it is called, thereby saving memory by not loading routines that are unused or rarely used. More specifically, dynamic loading can attach a shared library to the address space of the process during execution, look up the address of a function in the library, activate that function and then detach the shared library, e.g. remove it from memory, when it is no longer needed.

According to another aspect of the invention an apparatus is provided, comprising:

memory means for temporarily storing data;

processing means for processing data; and connecting means for connection between the memory means and processing means, wherein the above mentioned system is used.

According to another aspect of the invention a method is provided, comprising:

providing a program object with an external interface, that contains a description of one or more functions of the program object, for communication with other program objects;

loading a program component with one or more functions;

exporting a description of one or more functions of the loaded program component to the external interface of the program object.

The present invention will now be described by way of an example with reference to the accompanying drawings, throughout which like parts are referred to by like references, and in which:

FIG. 1 gives schematically an execution space with a program object and a loaded program component.

Figure 2:
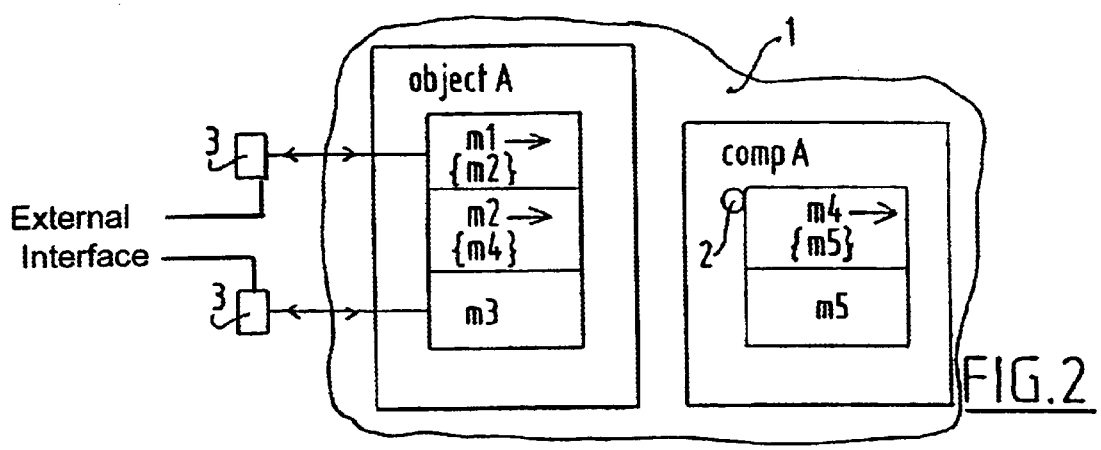

FIG. 2 gives schematically an execution space of an program object and a program component, which object is supplied with an external interface.

Figure 3:
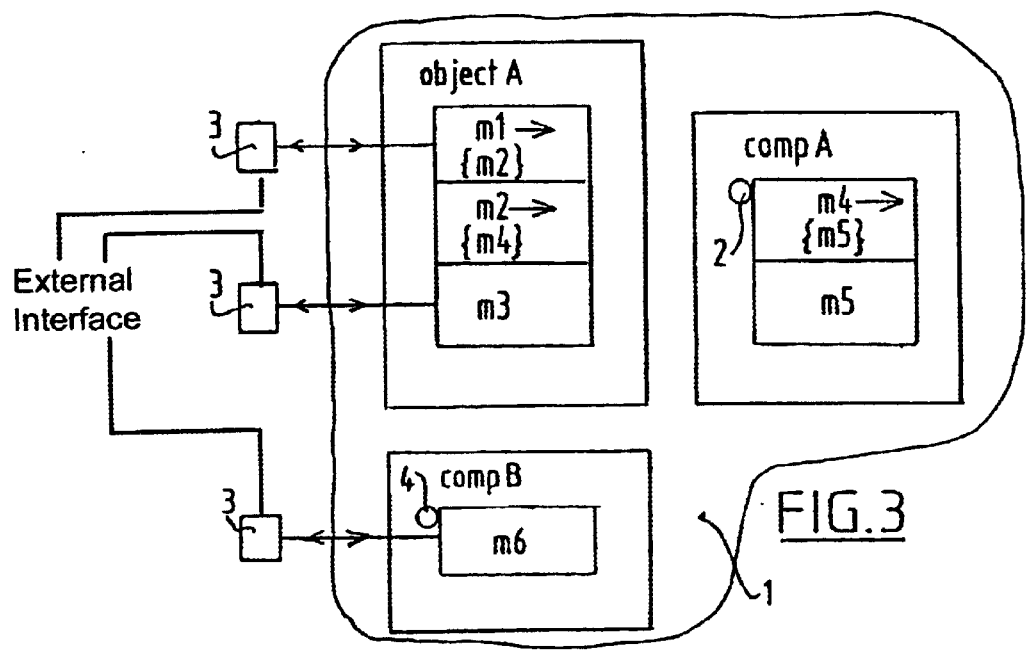

FIG. 3 gives the execution space of FIG. 2, wherein an additional program component has been added to the external interface of the program object.

Figure 4:
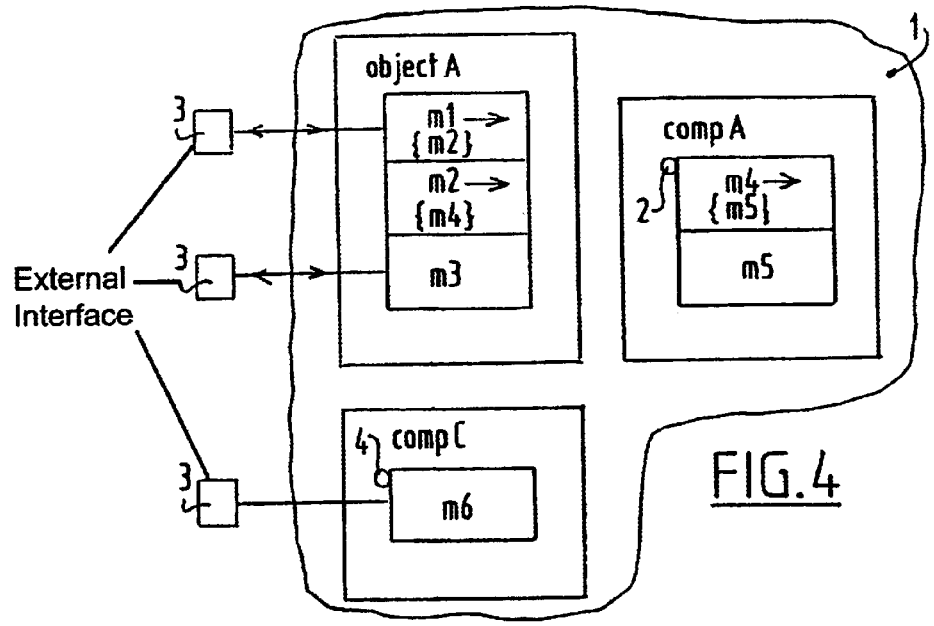

FIG. 4 gives the execution space of FIG. 3, wherein the program component has been substituted by a different program component.

Figure 5:
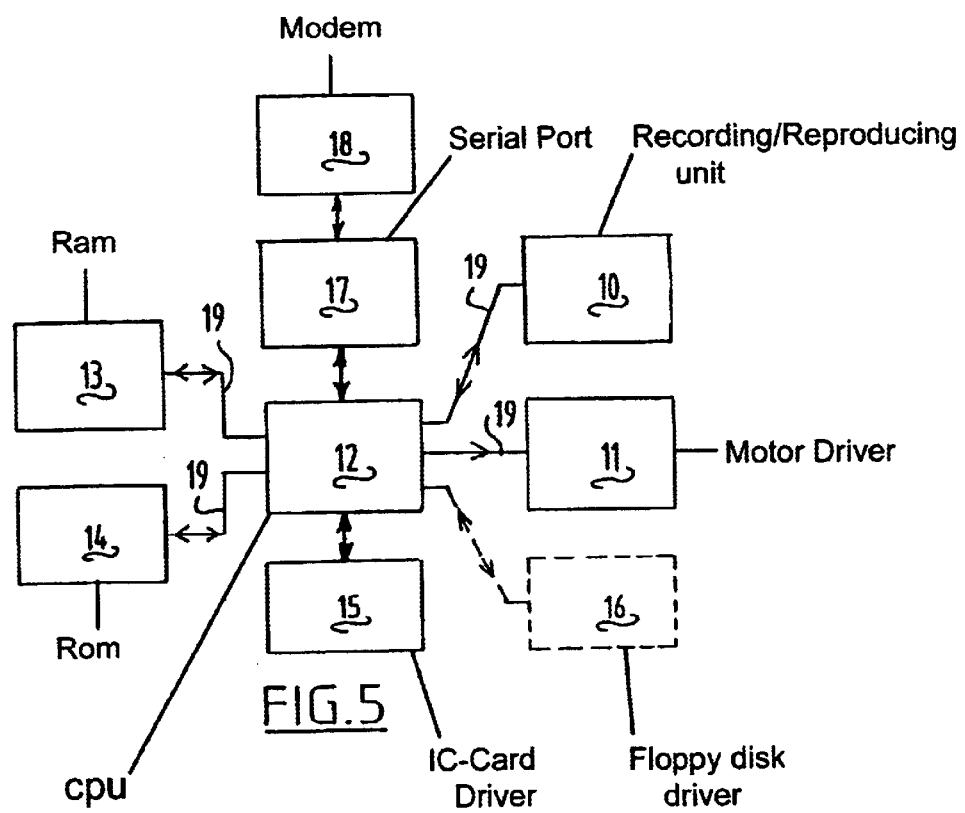

FIG. 5 gives an example of a video cassette recorder (VCR) wherein the system of the present invention is implemented.

Figure 6:
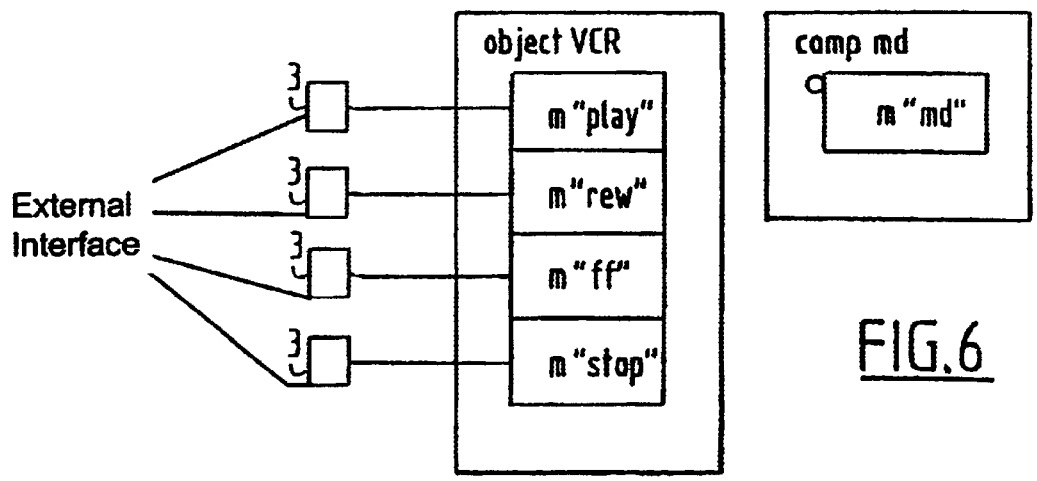

FIG. 6 gives schematically the execution space of the VCR of FIG. 5.

Figure 7:
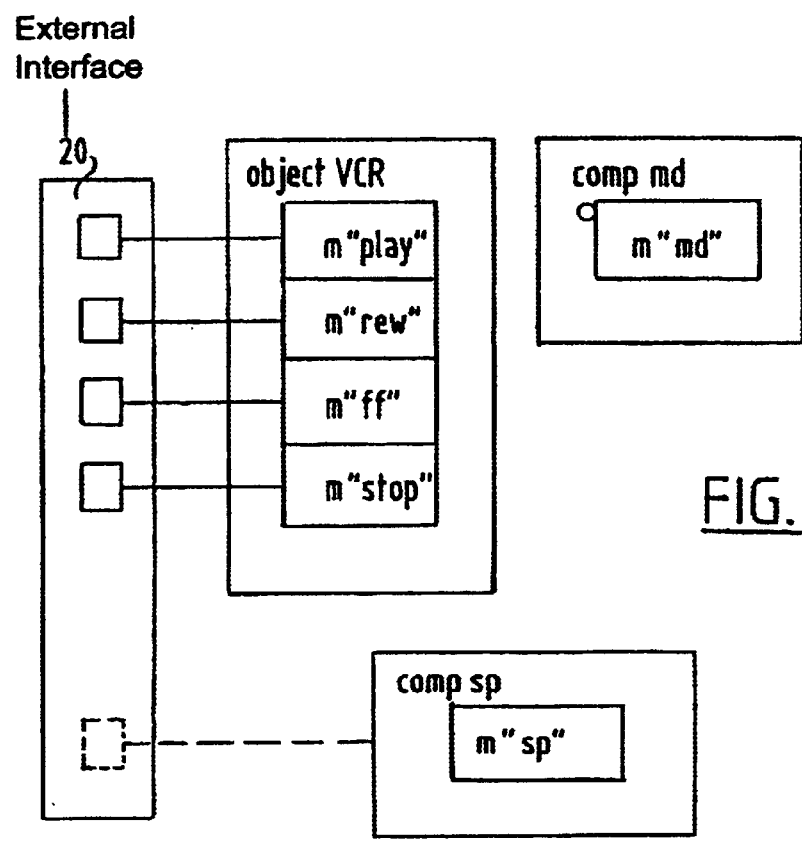

FIG. 7 gives schematically the execution space of the VCR.

In FIG. 1 the execution space of the program object is shown. Object A in execution space 1 comprises three methods, method 1 (m1), method 2 (m2) and method 3 (m3). In execution space 1 a program component compa is loaded, which contains two methods, method 4 (m4) and method 5 (m5). By a circle the internal interface 2 of program component compa is shown. Method m1 of object A calls method m2 of object A. Method m2 of object A calls via the internal interface method m4 of program component compa. Method m4 of program component compa calls method m5. Method m5 is not comprised in the internal interface 2 of program component compa and therefore this method can only be called from program component compa and not from program object A itself.

The internal interface 2 is the only supported way for communication between the object A and the component compa. As the code of the program object has no internal interface, the object cannot be called from the program component compa. Method m4 of program component compa cannot for example call method m1 or method m2 of program object A.

In FIG. 2 is shown the situation of FIG. 1 wherein additionally the external interface 3 of the execution space 1 is denoted by rectangles. Program objects from other execution spaces can communicate with the execution space of object A by means of this external interface 3. By arrows is shown which methods of program object A are accessible via the external interface 3. In this example method m1 and method m3 of program object A are accessible by other objects, that are outside the present execution space 1. The remaining methods can only be called from object A and/or from component compa.

During execution of the program new program components can be loaded in the execution space by dynamic loading. In FIG. 3 a program component compb is loaded. The external interface of program component compb is automatically exported to the external interface of the host object, in this case program object A. This means that the external interface 3 of the execution space is adapted to comprise the external interface 3 of the program component compb, which means that the number of methods that can be called via the external interface increases from two to three methods. Method m6 of program component compb can be called by a function call via the internal interface 4 by program object A and can be actuated by message passing via the external interface 3 by the remaining objects of the program.

It is also possible to substitute a program component compb during execution of the program by another program component compc. This is shown directly in FIG. 4. This means that the implementation of object A has developed during execution. Because of this it is for example possible to add new functionalities, to delete bugs in certain program components etcetera without interrupting the execution of the program or to restarting the processing unit, on which the program runs.

In FIG. 5 is shown a video cassette recorder (VCR-device) for recording/reproducing signals on video tape of a video cassette. The VCR-device has a recording/reproducing unit 10 that has the functionality of recording/reproducing data using the video tape. The motor driver 11 drives the video tape of the video cassette, i.e. functions like "play", "fast forward", "rewind", "record" and "stop" are implemented. The data recorded/reproduced on the video cassette by the VCR recording/reproducing unit 10 is received from or sent to a central processing unit 12. Also provided are random access memory 13 and read only memory 14 for storing a program therein.

The IC-card drive 15 has a slot into which is inserted an IC-card, as a recording medium having an integrated circuit in a card-shaped casing and an IC-card driving unit for writing/reading data on or from the IC-card. Alternatively a floppy disk drive 16 can be included which is a rotational driving unit for rationally driving a floppy disk and a head unit for recording/reproducing data on or from the floppy disk. The IC-card drive 15 or the floppy disk drive 16 takes care of recording data and instalment of application software. Also a serial port 17 and a modem 18 for in/output of data is provided. For communication between components 10 to 18 connections 19 are provided.

The VCR is designed to receive additional application functions in addition to the usual VCR-functions. For example, if a user intends to upgrade the version of the application software, that is for example to add new functions to the VCR-device, additional functional units can be installed via the IC-card drive 15. It is also possible to use the Internet to download through modem 18 and serial port 17 additional application software. This permits the user to upgrade the device function without repurchasing the VCR-device.

In FIG. 6 is shown the execution space for operating the play, rewind, fast forward and stop function of the VCR. The object "VCR" contains four methods (play), (rew), (ff), (stop) to implement the function play, rewind, fast forward and stop. These methods perform actions to play the video cassette, to rewind the video cassette, to wind the video cassette and to stop the video cassette respectively. One of the actions is for example the controlling of the motor driver 11 that drives the video tape. This is accomplished by calling program component compmd via this interface, which interface takes care of further treatment, for example by having the electric motor of the VCR spin with a certain speed. Via message passing with the external interface of the object "VCR", for example by pushing the buttons play, rewind, fast forward or stop on the remote control of the VCR or the VCR itself, the relevant method of the object "VCR" is initiated.

By for example an IC-card or an external data connection with the modem 18 and serial port 17 new programs can be loaded into the random access memory 13 of the VCR. In FIG. 7 for example program component compsp has been added that adds the function "slow play" to the already implemented functions of the VCR. This program component compsp has an external interface 20, which will upon loading in the execution space of the object "VCR" be added to the external interface 20 of the program object "VCR". Hereby an additional function, in this case the function "slow play" has been realized, which by message passing with the external interface of the program object is actuated. This means that it is possible during run time of the programs on the VCR and without restarting or initializing the VCR, to add a new function to a video recorder VCR.

What is claimed is:

1. A system, comprising:
    a program object with one or more functions; and
    an external interface with a description of the functions for communication with other program objects,
    wherein upon dynamic loading of a program component in a video cassette recorder a description of one or more functions of the program component is exported to the external interface of the program object; and
    whereby said program object, said other program objects and said program component are adapted to be stored in a memory in said video cassette recorder.

2. System according to claim 1, wherein upon loading of an additional program component the description of one or more functions thereof is added to the external interface of the program object for communication with other program objects.

3. System according to claim 1 and/or 2, wherein upon removing the program component the description thereof in the external interface of the program object is removed from the external interface.

4. System according to claim 1, 2 and/or 3, wherein upon replacing a first program component by a second program component, the description in the external interface of one or more functions of the first program component is replaced by a description of one or more functions of the second program component.

5. A system, comprising:
    a program object with one or more functions;
    an external interface with a description of the functions of the program object for communication with other program objects; and
    at least one program component with one or more functions adapted to be dynamically loaded in a video cassette recorder, wherein for each program component the description of the functions is added to the external interface of the program object;
    whereby said program object, said other program objects and said program component are adapted to be stored in a memory in said video cassette recorder.

6. System in accordance with any of the preceding claims, wherein functions in a program object are mutual accessible.

7. System in accordance with any of the preceding claims, wherein functions in a program component are mutual accessible.

8. System in accordance with any of the preceding claims, wherein a program component comprises an internal interface with the description of the functions of the program component that are accessible by the corresponding program object.

9. System in accordance with any of the preceding claims, wherein functions of a program component are accessible via the external interface by other program objects.

10. System according to any of the preceding claims, wherein communication via the external interface occurs by message passing.

11. An apparatus comprising:
    memory means for temporarily storing data;
    processing means for processing data; and
    connecting means for connection between the memory means and processing means, wherein a system according to claim 5 is used.

12. Apparatus according to claim 11, wherein a program component upon execution of the corresponding program object is transferred to the memory means.

13. Apparatus according to claims 11 or 12, wherein program component is removable from the memory means directly after execution thereof.

14. A method for communication in and between program objects and/or program components, comprising the steps of:
    providing a program object with an external interface, that contains a description of one or more functions of the program object, for communication with other program objects;
    dynamically loading a program component with one or more functions in a video cassette recorder; and
    exporting a description of one or more functions of the loaded program component to the external interface of the program object;
    whereby said program object, said other program objects and said program component are adapted to be stored in a memory in said video cassette recorder.

* * * * *